UNITED STATES PATENT OFFICE.

CHARLES M. A. STINE AND JOHN LAWRENCE GILSON, OF WILMINGTON, DELAWARE, ASSIGNORS TO E. I. DU PONT DE NEMOURS & COMPANY, OF WILMINGTON, DELAWARE, A CORPORATION OF DELAWARE.

PROCESS OF PRODUCING PICRIC ACID.

1,393,714.     Specification of Letters Patent.     Patented Oct. 11, 1921.

No Drawing.     Application filed October 25, 1919. Serial No. 333,361.

*To all whom it may concern:*

Be it known that we, CHARLES M. A. STINE and JOHN LAWRENCE GILSON, citizens of the United States, and residents of Wilmington, in the county of New Castle and State of Delaware, have invented a certain new and useful Process of Producing Picric Acid, of which the following is a specification.

This invention relates to a process of making picric acid wherein dinitrophenol is nitrated under such carefully controlled conditions as to materially reduce the operating time which has heretofore been considered necessary, as well as to effect economies in the use of reagents.

In the nitration of dinitrophenol to trinitrophenol (picric acid) as practised in the prior art it has been generally supposed that sulfonation of the dinitrophenol was an essential preliminary to the introduction of a third nitro group. A large amount of time was usually consumed in allowing this supposedly necessary sulfonation to take place, and a large excess of sulfuric acid was employed. We have discovered that this preliminary sulfonation is not essential, and that the extra time and excess sulfuric acid ordinarily consumed to bring about this sulfonation were simply wasted.

We have found that to effect a good nitration it is necessary only to have the dinitrophenol suspended in the sulfuric acid. Consequently instead of working with about 4 parts of sulfuric acid to 1 part of dinitrophenol in the first mixture to provide for sulfonation, we use substantially less than 4 parts, as for example 3½ parts or less, and preferably between 1½ and 3 parts, of sulfuric acid to 1 part of dinitrophenol.

One preferred embodiment of our invention is set forth in detail in the following example, but it will be understood that this example is merely illustrative and may be modified in various ways without departing from our invention as defined in the appended claims:—

Example.

1.5 parts of sulfuric acid of from 92 to 98% strength is poured into a nitrating vessel, and 1 part of dinitrophenol is gradually added at room temperature with vigorous agitation during the course of half an hour. The mixture is then heated so that at the end of the next half hour the temperature will have reached 160° F. A nitrating mixture consisting of 80% (by weight) nitric acid and 20% of sulfuric acid is then gradually added in the course of next 2 hours at such a rate that the quantity of nitric acid added at the end of the two hours will be about 1.5 times that required by theory. During this addition of the acid mixture the temperature is preferably maintained between 160 and 170° F.

When the addition of the nitrating acid mixture has been completed the temperature of the reaction mass is raised in the course of half an hour to about 200° F. and maintained at this temperature for another half hour. It is then cooled to between 80 and 125° F. and preferably to about 100° F. 2 parts of so-called "spent acid" is added thereto and the mixture is further cooled to about 40° F. before it is discharged from the nitrating vessel, the entire cooling operation requiring about half an hour. The addition of the so-called "spent acid" dilutes the mixture to such an extent that the picric acid may then be removed in any convenient manner as by filtration or by means of a centrifugal separator.

As will be evident from the above example, the total time required for the nitrating operation is four and one-half (4½) hours, as compared with the 9 or 10 hours consumed in operating according to the old process.

The spent acid above referred to is acid resulting from a previous nitration and contains about 75% sulfuric acid, 2 to 3% nitric acid, 1½–2% picric acid, and water. If it is desired to dispense with the addition of spent acid, this may be done by using at the start 2 parts of concentrated sulfuric acid instead of 1.5 parts.

As an indication of the permissible variations in temperatures it may be stated that the temperature to which the mixture of sulfuric acid and dinitrophenol is raised by the end of the first hour may be about 150° F. or about 180° F. instead of 160° F., that during the addition of nitrating acid the mixture may be maintained between 160 and 200° F.; and that the subsequent heating may be sufficient to raise the temperature to about 235° F. instead of to 200° F. The temperature (40-50° F.) to which the reaction mass is cooled in order to separate picric acid from the residual liquor is the temperature of minimum solubility of picric acid in the solution resulting from the nitrating operation.

The duration of the process will, of course, be shortened somewhat by working at the higher alternative temperatures just mentioned.

We claim:

1. The process of producing picric acid which comprises suspending dinitrophenol in concentrated sulfuric acid, gradually adding thereto a mixture of nitric and sulfuric acids while maintaining the temperature between 160 and 200° F., heating the resulting reaction mixture at a temperature of 200 to 235° F. for about an hour, and then cooling said reaction mixture.

2. The process of producing picric acid which comprises suspending dinitrophenol in concentrated sulfuric acid, gradually adding thereto a mixture containing about 80% of nitric acid and about 20% of sulfuric acid while maintaining the temperature between 160 and 200° F., heating the resulting reaction mixture at a temperature of 200 to 235° F. for about an hour, and then cooling said reaction mixture.

3. The process of producing picric acid which comprises suspending dinitrophenol in concentrated sulfuric acid, gradually adding thereto a mixture containing about 80% of nitric acid and about 20% of sulfuric acid while maintaining the temperature between 160 and 170° F., heating the resulting reaction mixture at a temperature of 200 to 235° F. for about an hour, and then cooling said reaction mixture.

4. The process of producing picric acid which comprises thoroughly mixing 1 part of dinitrophenol with from about 1½ to 3½ parts of sulfuric acid of from about 92 to 98% strength, gradually adding thereto a mixture of nitric and sulfuric acids while maintaining the temperature between 160 and 200° F., heating the resulting reaction mixture at a temperature of from 200 to 235° F. for about an hour, and then cooling said reaction mixture.

5. The process of producing picric acid which comprises thoroughly mixing 1 part of dinitrophenol with from about 1½ to 3½ parts of sulfuric acid of from about 92 to 98% strength, gradually adding thereto a mixture containing about 80% of nitric acid and about 20% of sulfuric acid while maintaining the temperature between 160 and 200° F., heating the resulting reaction mixture at a temperature of from 200 to 235° F. for at least half an hour, and then cooling the mixture to facilitate the separation therefrom of picric acid.

6. The process of producing picric acid which comprises gradually adding, at room temperature 1 part of dinitrophenol in the course of about half an hour to from about 1½ to 3½ parts of sulfuric acid of from about 92 to 98% strength, while agitating the mixture, raising the temperature of the mixture during about half an hour to between 150 and 180° F., gradually adding in the course of about 2 hours a nitrating mixture containing nitric and sulfuric acids, while maintaining the temperature between 160 and 200° F., raising the temperature during the next half hour to between 200 and 235° F., continuing the heating between 200 and 235° F. for about half an hour adding about 2 parts of a solution containing about 75% of sulfuric acid, and cooling the resulting mixture to between 80 and 125° F.

7. The process of producing picric acid which comprises gradually adding, at room temperature 1 part of dinitrophenol in the course of about half an hour to from about 1½ to 3½ parts of sulfuric acid of from about 92 to 98% strength, while agitating the mixture, raising the temperature of the mixture during about half an hour to between 150 and 180° F., gradually adding in the course of about 2 hours a nitrating mixture containing about 80% of nitric acid and about 20% of sulfuric acid while maintaining the temperature between 160 and 200° F., raising the temperature during the next half hour to between 200 and 235° F., continuing the heating between 200 and 235° F. for about half an hour, and then cooling the reaction mixture to between 80 and 125° F. by adding about 2 parts of a solution containing about 75% of sulfuric acid.

8. The process of producing picric acid which comprises gradually adding, at room temperature 1 part of dinitrophenol in the course of about half an hour to from about 1½ to 3½ parts of sulfuric acid of from about 92 to 98% strength, while agitating the mixture, raising the temperature of the mixture during about half an hour to between 150 and 180° F., gradually adding in the course of about 2 hours a nitrating mixture, containing nitric and sulfuric acids, while maintaining the temperature between 160 and 200° F., raising the temperature during the next half hour to between 200 and 235° F., continuing the heating between 200 and 235° F. for about half an hour, adding about 2 parts of a solution containing about 75% of sulfuric acid, and cooling the resulting mixture to about 40° F. to cause the picric acid formed to crystallize out.

9. In the process of producing picric acid from dinitrophenol, the step which comprises preparing a suspension of 1 part of dinitrophenol in from about 1½ to 3 parts of concentrated sulfuric acid.

10. In the process of producing picric acid from dinitrophenol, the steps which comprise preparing a suspension of 1 part of dinitrophenol in from about 1½ to 3 parts of concentrated sulfuric acid, and then nitrating the dinitrophenol in said suspension with an amount of nitric acid in excess of that theoretically required at a temperature between 160 and 235° F.

11. In the process of producing picric acid from dinitrophenol, the step which comprises adding a nitrating acid containing an amount of nitric acid in excess of that theoretically required, in the course of about 2 hours, to a suspension of dinitrophenol in concentrated sulfuric acid, while maintaining the temperature between 160 and 200° F.

12. In the process of producing picric acid from dinitrophenol, the steps which comprise adding a mixture containing about 80% of nitric acid and about 20% of sulfuric acid to a suspension of dinitrophenol in concentrated sulfuric acid while maintaining the temperature between 160 and 200° F., the amount of nitric acid added being about 1½ times that required by theory, and continuing the heating at a temperature of about 200° F. for at least half an hour after the nitric acid mixture has been added.

13. In the process of producing picric acid from dinitrophenol, the steps which comprise adding a mixture containing sulfuric acid and about 80% of nitric acid to a suspension of dinitrophenol in concentrated sulfuric acid while maintaining the temperature between 160 and 200° F., the amount of nitric acid added being about 1½ times that required by theory, continuing the heating at a temperature of about 200° F. for at least one-half hour after the nitric acid mixture has been added, cooling the reaction mixture to between 80° and 125° F., and adding thereto spent acid containing about 75% of sulfuric acid, the amount of spent acid added being equal in weight to about twice the weight of dinitrophenol employed.

In testimony whereof we affix our signatures.

CHARLES M. A. STINE.
JOHN LAWRENCE GILSON.